United States Patent [19]

Berry

[11] Patent Number: 4,718,361
[45] Date of Patent: Jan. 12, 1988

[54] ALKALI INJECTION SYSTEM WITH CONTROLLED CO₂/O₂ RATIOS FOR COMBUSTION OF COAL

[75] Inventor: Gregory F. Berry, Naperville, Ill.

[73] Assignee: The United States of America as represented by the Department of Energy, Washington, D.C.

[21] Appl. No.: 933,460

[22] Filed: Nov. 21, 1986

[51] Int. Cl.⁴ ............ F23J 11/00; F23J 15/00
[52] U.S. Cl. .................... 110/345; 110/204; 431/115
[58] Field of Search ........... 110/345, 348, 341, 347, 110/204; 431/8, 9, 115

[56] References Cited

U.S. PATENT DOCUMENTS

| | | |
|---|---|---|
| 3,524,720 | 8/1970 | Bauer . |
| 3,574,544 | 4/1971 | Heredy et al. . |
| 3,671,185 | 6/1972 | Lefrancois et al. . |
| 3,873,670 | 3/1975 | Dugan et al. . |
| 3,919,390 | 11/1975 | Moore . |
| 3,920,794 | 11/1975 | Le Mantia et al. . |
| 3,987,147 | 10/1976 | Guerrieri . |
| 4,011,299 | 3/1977 | Henis et al. . |
| 4,018,572 | 4/1977 | Swanson . |
| 4,080,428 | 3/1978 | Holtzer et al. . |
| 4,135,874 | 1/1979 | Tsuzi et al. ............ 431/115 |
| 4,156,712 | 5/1979 | Kanai et al. . |
| 4,166,838 | 9/1979 | Tatani . |
| 4,244,930 | 1/1981 | Weber . |
| 4,377,557 | 3/1983 | Lowell . |
| 4,426,364 | 1/1984 | Cooper . |
| 4,452,766 | 6/1984 | Pike . |
| 4,512,266 | 4/1985 | Shigaki ............ 110/204 |
| 4,547,351 | 10/1985 | Im et al. . |

Primary Examiner—Edward G. Favors
Attorney, Agent, or Firm—William Lohff; James W. Weinberger; Judson R. Hightower

[57] ABSTRACT

A high temperature combustion process for an organic fuel containing sulfur in which the nitrogen of air is replaced by carbon dioxide for combination with oxygen with the ratio of $CO_2/O_2$ being controlled to generate combustion temperatures above 2000 K. for a gas-gas reaction with $SO_2$ and an alkali metal compound to produce a sulfate and in which a portion of the carbon-dioxide rich gas is recycled for mixing with oxygen and/or for injection as a cooling gas upstream from heating exchangers to limit fouling of the exchangers, with the remaining carbon-dioxide rich gas being available as a source of $CO_2$ for oil recovery and other purposes.

8 Claims, 1 Drawing Figure

ALKALI INJECTION SYSTEM WITH CONTROLLED $CO_2/O_2$ RATIOS FOR COMBUSTION OF COAL

CONTRACTUAL ORIGIN OF THE INVENTION

The U.S. Government has rights in this invention pursuant to Contract No. W-31-109-ENG-38 between the U.S. Department of Energy and The University of Chicago representing Argonne National Laboratory.

BACKGROUND OF THE INVENTION

This invention relates to a process for combustion of coal and other organic fuels at a high temperature and in a mixture of carbon dioxide and oxygen to provide a combustion gas containing carbon dioxide as a major component. More particularly, the invention relates to a process involving the combustion of an organic fuel and a recycle of a portion of the carbon dioxide wherein a reduced quantity of combustion gas is available as a saleable product and is disposed in an environmentally satisfactory way, thereby reducing the so called "greenhouse effect".

In conventional combustion of coal, air serves as the source of oxygen to support combustion and provide a combustion gas containing nitrogen, carbon dioxide, water and other gases released to the atmosphere. Depending on its concentration and ease of separation, the carbon dioxide may have value for use in oil recovery and other purposes.

In the process, nitrogen oxides may be generated from the nitrogen gas in the air and from nitrogen compounds in the fuel. In addition, sulfur oxides from sulfur in the coal are also usually formed in the combustion process. Unless removed, these components are part of the product stream and may have detrimental effects on the value of the product stream. Scrubbers and other techniques for removing the sulfur and nitrogen oxides may be used but in general have disadvantages due to their cost, complexity and reduced efficiency of the entire process.

Efforts have been directed to reduce the content of these oxides in the combustion gas. In one process described in U.S. Pat. No. 4,547,351, the sulfur oxides are converted to alkali metal sulfates in a gas-gas reaction. The resulting sulfates are then cooled to form solid particles prior to passage through heat exchangers to reduce clogging of the heat exchangers. While this process has advantages, it is not specifically designed to remove nitrogen oxides and utilizes air for combustion purposes.

Accordingly, one object of the invention is a reduction in the formation and content of detrimental oxides in combustion gas from an organic fuel. A second object of the invention is a system to facilitate the separation of a carbon dioxide stream from combustion gas. Another object of the invention is the reduction in combustion gas released to the atmosphere. These and other objects will become apparent from the following description.

SUMMARY OF THE INVENTION

Briefly, the invention involves a combustion process for an organic fuel in which the nitrogen of air is replaced by carbon dioxide which is mixed with oxygen with the ratio being controlled to generate combustion temperatures above 2000° K. (and perhaps as high as 2400K) in a combustion zone to form a combustion gas. Advantageously, the process includes additional recycling of a portion of the flue gas for mixing with combustion gas for the purpose of cooling the combustion gas. The invention may be further characterized by the removal of a portion of the carbon dioxide from the combustion gas to maintain the volume of the combustion gas being returned to the furnace and to provide a product for use in oil recovery systems and other purposes. The invention is further characterized by the $CO_2/O_2$ ratio being selected in a range of 2.2–2.5 to control and extend the boiler performance to simulate combustion of coal in air.

Several advantages are associated with the invention. First, by using a low $CO_2/O_2$ ratio, higher flame temperatures can be achieved, thereby substantially promoting the gas-gas reaction between alkali atoms and sulfur gases.

Second, by providing a means for injecting additional $CO_2$ at various locations removed from the combustion zone, the heat transfer rate and cooling of the alkali sulfates can be tightly controlled without suffering either the loss in efficiency inherent in conventional gas recycle techniques or the added cost associated with the larger mass throughput rate and heat transfer surface area.

Third, there is the ability to use the concept in retrofit applications by tailoring the $C_2$ quantity recycled to match the heat utilization performance previously achieved using air as the oxidizing medium.

Fourth, a natural reduction in nitrous oxides is achieved by eliminating the reaction of oxygen with the nitrogen in the oxidizer.

BRIEF DESCRIPTION OF THE PREFERRED EMBODIMENT

FIG. 1 is a schematic of a combustion process as one embodiment of the invention.

DETAILED DESCRIPTION OF THE PREFERRED EMBODIMENT

Figure 1:
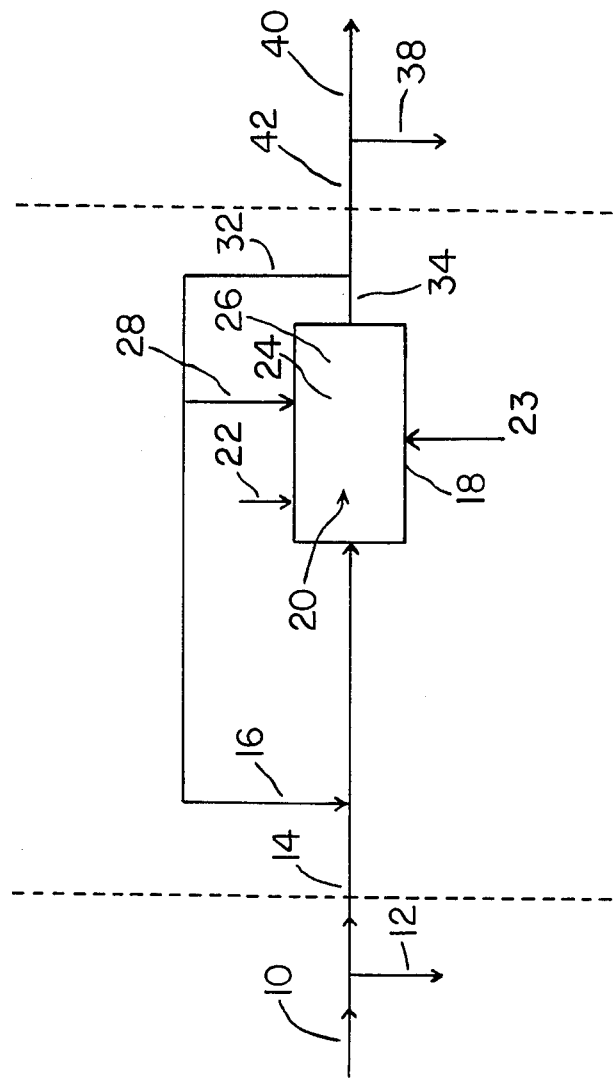

Combustion processes utilizing a conventional organic fuel such as coal to generate a hot combustion gas at temperatures in the order of 1900–2200K. After these tempertures are cooled in the furnace, the combustion gas is directed past one or more heat exchangers in exit duct work to extract additional heat and then diverted to the stack. Sulfur oxides in the combustion gases either are removed or exit with the stack gases. In some instances, as described in U.S. Pat. No. 4,547,351, (which is hereby incorporated herein by reference), a sodium compound such as $Na_2CO_3$, $NaHCO_3$, $NaCl$, $NaOH$ or the like is introduced to convert the sulfur oxide to sodium sulfate which may be at least partially removed by a scrubber. The combustion gas also may contain a nitrogen oxide derived from nitrogen compounds in the fuel. The nitrogen oxide may remain in the gas and exit through the stack.

In U.S. Pat. No. 4,547,351, the combustion temperature is maintained above about 1400K to provide a gas-gas reaction between the sodium compound and the sulfur oxide. While this process has advantages, higher combustion temperatures will increase the rate of reaction and provide a more complete reaction within the short time available within the combustion zone.

In this invention, the combustion temperature is increased to about 2000K by introducing a mixture of carbon dioxide and oxygen to the combustion zone with the ratio being controlled to generate the desired combustion temperature. Suitably, the ratio is in the range of about 1.5-2.0 on a molar basis. The gas is further characterized by having essentially no nitrogen or levels below about 1 wt. %.

A sodium compound may then be introduced to react with any sulfur oxide in the combustion gas and form sodium sulfate. Suitable sodium compounds include $Na_2CO_3$, NaCl, NaOH or the like. It may be injected as a dry powder, or mixed with water, or in a dry mixture with pulverized coal or the like.

The resulting combustion gas may be tempered with additional $CO_2$ gas to protect heat exchanger surfaces in the furnace before being directed to one or more heat exchangers at the exit of the furnace. Prior to the first external heat exchanger, additional carbon dioxide is introduced to cool the combustion gas to below 1150K to form particles of sodium sulfate and reduce clogging of the heat exchanger or exchangers. The resulting ratio of carbon dioxide to oxygen is generally in the range of about 2.2-2.5.

A portion of the flue gas (cooled combustion gas) may be separated to provide a source of carbon dioxide. The reduced quantity sulfur and/or nitrogen oxides may remain in the carbon dioxide stream when the $C_2$ is used for oil recovery or may be removed in a scrubber with the nitrogen oxides being removed with amine additives as described in U.S. Pat. No. 4,612,175 (which is hereby incorporated herein by reference).

Preferably, the remaining flue gas is recycled to the combustion zone to be combined with oxygen or used to cool the combustion gas. The amount recycled is selected to maintain the desired gas to the combustion zone, desired $CO_2/O_2$ ratio and maintain efficient heat utilization for the furnace exit temperature.

One embodiment of the invention is illustrated in FIG. 1. In the process, a stream 12 of nitrogen (used as a saleable product or saleable product or dumped into environment) is separated from a source 10 of air leaving a stream, 14 of oxygen. Carbon dioxide from stream 16 is mixed with oxygen at a ration of $C_2/O_2$ of about 1.5-2.0 and introduced into a combustion zone 20 of furnace 18. Coal in finely divided form is introduced in stream 22 to combustion zone 20. A sodium compound as an alkali metal compound is then introduced by stream 23 to react with any sulfur oxide in the combustion gas and form sodium sulfate.

Combustion gas is produced in the reaction and directed to heat exchangers 24 and 26 within the duct work of furnace 18. Prior to passing through heat exchanger 24, a stream 28 of carbon dioxide is introduced into the combustion gas for cooling the gas to below about 1150K. Additional $CO_2$ gas may be introduced at locations between 18 and 28 to temper the hot gas temperatures near the heat exchange surfaces in the furnace. The cooling gas is provided by the cooled flue gas downstream from the heat exchangers. As illustrated, the carbon dioxide stream 32 is removed from the flue gas stream 34 with stream 28 being used to cool the upstream combustion gas and stream 16 providing carbon dioxide for mixing with oxygen. The remaining flue gas in stream 42 is either direction to a pipeling without additional separation or may be treated to remove water, sulfur oxide or sodium sulfate, and/or nitrogen oxide. An additional method would be to clean the flue gas before recycling, thus reducing water and trace species concentrations in the recycled flue gas. As illustrated, water is removed in stream 38 with the sulfur oxide and nitrogen oxide being removed in stream 40 from stream 42. Preferably, the carbon dioxide in stream 42 is utilized for oil recovery or other commercial purpose.

Additional objects, advantages and novel features of the invention will be set forth in part in the description which follows, and in part will become apparent to those skilled in the art upon examination of the following or may be learned by practice of the invention.

The embodiments of this invention in which an exclusive property or privilege is claimed are defined as follows:

1. A combustion process for an organic fuel comprising the steps of providing a combustion zone for burning a fuel with oxygen, introducing an organic fuel to a combustion zone, introducing a mixture of carbon dioxide and oxygen to the combustion zone to form a combustion gas, the mixture having essentially no nitrogen gas, providing heat exchanger means downstream from the combustion zone, introducing a carbon dioxide as a cooling gas into the combustion gas between the combustion zone and the heat exchanger means to reduce the temperature of the combustion gas to below about 1150K and from a cooled combustion gas, and, recycling a portion of the cooled combustion gas to be combined with oxygen for the combustion zone.

2. The process of claim 1 including the step of removing a portion of the recycled cooled combustion gas as the cooling gas.

3. The process of claim 2 including the step of controlling the ratio of $CO_2/O_2$ to develop combustion temperatures above about 2000K.

4. The process of claim 3 including the step of introducing an alkali metal based compound to the combustion zone to combine in a gas-gas reaction with sulfur oxide and form an alkaki metal sulfate.

5. The process of claim 3 wherein the step of controlling the ratio of $CO_2/O_2$ provides a ratio in the range of about 1.5-2.0.

6. The process of claim 5 wherein the step of introducing a cooling gas of carbon dioxide provides a $CO_2/O_2$ ratio in the range of about 2.2-2.5.

7. The process of claim 4 including the step of removing at least a portion of water, alkali metal sulfate, nitrogen oxide, or mixtures thereof from the remaining combustion gas following or before removal of the recycled gas.

8. The process of claim 4 including the step of using the remaining combustion gas following removal of the recycled gas for a source of $CO_2$ for oil recovery.

* * * * *